(12) United States Patent
Taira et al.

(10) Patent No.: US 6,998,454 B2
(45) Date of Patent: Feb. 14, 2006

(54) FLUORINE-CONTAINING RESIN MATERIAL LOWLY PERMEABLE TO LIQUID CHEMICAL

(75) Inventors: Takahiro Taira, Settsu (JP); Takahisa Aoyama, Settsu (JP); Katsuhide Otani, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/465,643

(22) Filed: Jun. 20, 2003

(65) Prior Publication Data

US 2003/0220458 A1      Nov. 27, 2003

Related U.S. Application Data

(62) Division of application No. 10/148,232, filed as application No. PCT/JP00/08286 on Nov. 24, 2000, now abandoned.

(30) Foreign Application Priority Data

Nov. 29, 1999   (JP)   ................................. 11-338454

(51) Int. Cl.
*C08F 16/24*   (2006.01)

(52) U.S. Cl. .................. 526/247; 526/249; 428/421
(58) Field of Classification Search ................ 526/247, 526/249; 428/421
See application file for complete search history.

(56) References Cited

U.S. PATENT DOCUMENTS

| | | | | |
|---|---|---|---|---|
| 4,262,101 A | * | 4/1981 | Hartwimmer et al. | ......... 526/89 |
| 5,260,392 A | * | 11/1993 | Arcella et al. | ............... 526/247 |
| 5,317,061 A | * | 5/1994 | Chu et al. | .................... 525/200 |
| 6,153,303 A | * | 11/2000 | Namura et al. | ............. 428/421 |
| 6,291,054 B1 | * | 9/2001 | Thomas et al. | ............. 428/141 |
| 6,395,848 B1 | | 5/2002 | Morgan | |
| 6,403,213 B1 | | 6/2002 | Huesmann | |
| 6,416,698 B1 | | 7/2002 | Mertdogan | |
| 6,429,258 B1 | | 8/2002 | Morgan | |

FOREIGN PATENT DOCUMENTS

| | | |
|---|---|---|
| JP | 11-116706 A | 4/1999 |
| JP | 11-210941 * | 8/1999 |
| JP | 11-210941 A | 8/1999 |
| WO | WO 97/39017 A1 | 10/1997 |

OTHER PUBLICATIONS

English language translation of International Preliminary Examination Report for PCT/JP00/08286 dated Jan. 22, 2002.
International Search Report for PCT/JP00/08286, filed Feb. 27, 2001.

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

To provide a suitable material having improved impermeability to liquid chemicals and cracking resistance while retaining excellent heat resistance and processability inherent in FEP-based fluororesins, a molded article of which is useful in the field of semiconductor production apparatus and the like. The present invention provides a fluorine-containing resin material comprising a fluorine-containing copolymer comprising 85 to 95.5% by mole of a repeating unit derived from tetrafluoroethylene, 5 to 10% by mole of a repeating unit derived from hexafluoropropylene and 0.1 to 5% by mole of a repeating unit derived from at least one higher perfluoro(vinyl ether) represented by the formula (1):

$$CF_2=CF-O-Rf^1 \qquad (1)$$

wherein $Rf^1$ is a perfluoroalkyl group having 5 to 10 carbon atoms or a perfluoro(alkoxyalkyl) group having 4 to 17 carbon atoms, and molded article thereof.

2 Claims, 1 Drawing Sheet

FLUORINE-CONTAINING RESIN MATERIAL LOWLY PERMEABLE TO LIQUID CHEMICAL

This is a divisional of application Ser. No. 10/148,232 filed May 28, 2002; now abandoned, which is a 371 of PCT/JP00/08286, filed Nov. 24, 2000 and the disclosure of which is incorporated herein by reference.

TECHNICAL FIELD

The present invention relates to a fluorine-containing resin material which has excellent impermeability to liquid chemicals and a molded article using the same.

BACKGROUND ART

In the field of producing semi-conductors, a large amount of liquid chemicals and water have been conventionally used in wet processes. A fluorine-containing resin having excellent chemical resistance, heat resistance and melt moldability is used for pipes transporting such liquid chemicals. Among fluorine-containing resins, a copolymer (PFA) of tetrafluoroethylene (TFE) and perfluoro(alkyl vinyl ether) (PAVE) and a copolymer of TFE and hexafluoropropylene (HFP) are excellent in chemical resistance, heat resistance, melt moldability and stress cracking resistance, and thus preferably used for piping arrangements such as tubes and joints for transporting liquid chemicals.

However, these PFA or FEP piping arrangements have a problem of chemical liquid permeation in a small amount and needs some improvement. In current semiconductor production plants, there are some countermeasures such as covering the outside of a tube with a pipe made of poly(vinyl chloride) (PVC) to make a double piping structure, or in the wet station area, exchanging tubes regularly, wrapping them with a PVC film or further wiping the outside of a tube with a cloth.

These measures increase equipment and maintenance costs as might be expected, resulting in the increase of the cost for producing semiconductors.

As mentioned above, it is now practically difficult to solve liquid chemical permeation problem of PFA or FEP in view of structure and maintenance, and therefore improvements are investigated with respect to its materials.

For example, there is a measure to increase crystallinity of PFA or FEP. It is effective to increase crystallinity thereof since permeation of liquid chemical is generally observed at amorphous parts. It is possible to increase crystallinity by decreasing the amount of PAVE in case of PFA and HFP in case of FEP. In this case, however, there arise defects that processability and crack resistance are decreased.

In addition, Japanese Unexamined Patent Publication No. 116706/1999 discloses a process for irradiating a molded article of a fluorine-resin such as PFA or FEP with ionizing radiation under inert gas atmosphere at temperature of at least the melting point to cross-link the polymers, thereby improving gas barrier property. However, special apparatus is required for such treatment, and this is not preferable from an economical point of view.

Alternatively, there is a measure to use a fluorine-containing resin more impermeable to liquid chemicals, and among the fluorine-containing resins, it is effective to choose poly(chlorotrifluoroethylene) which is the most impermeable to liquid chemicals. However, this resin has a problem that it is poor in stress cracking resistance, moldability and heat resistance.

Furthermore, modification of FEP is also proposed. For example, Japanese Examined Patent Publication No. 45084/1980 discloses modification of FEP by using particular PAVE, thereby improving tensile strength and stress cracking resistance at high temperature. PAVE used for the modification is lower PAVE with alkyl group having at most 4 carbon atoms, which shows no prevention effect on liquid chemical permeation.

Japanese Unexamined Patent Publication No. 210941/1999 also discloses production of a tube using a terpolymer comprising TFE, HFP and PAVE, in which sphaerites of FEP is made smaller. PAVE used in this case is also lower PAVE with alkyl group having at most 4 carbon atoms, which shows no prevention effect on liquid chemical permeation.

An object of the present invention is to provide a melt-moldable fluorine-containing resin material which can provide, in an economically efficient manner, a molded article having excellent impermeability to liquid chemicals while retaining excellent processability, heat resistance and the like inherent in FEP and a molded article using the same.

As a result of intensive studies, it has been found that chemical impermeability can be improved without losing inherent properties of a resin by modifying FEP using a particular perfluoro(alkyl vinyl ether) and the present invention has been completed.

DISCLOSURE OF INVENTION

The present invention relates to a fluorine-containing resin material lowly permeable to liquid chemical comprising a fluorine-containing copolymer comprising 85 to 95.5% by mole of a repeating unit derived from tetrafluoroethylene (TFE), 5 to 10% by mole of a repeating unit derived from hexafluoropropylene (HFP) and 0.1 to 5% by mole of a repeating unit derived from at least one higher perfluoro (vinyl ether) represented by the formula (1):

$$CF_2=CF-O-Rf^1 \qquad (1)$$

wherein $Rf^1$ is a perfluoroalkyl group having 5 to 10 carbon atoms or a perfluoro(alkoxy alkyl) group having 4 to 17 carbon atoms.

BEST MODE FOR CARRYING OUT THE INVENTION

Figure 1:
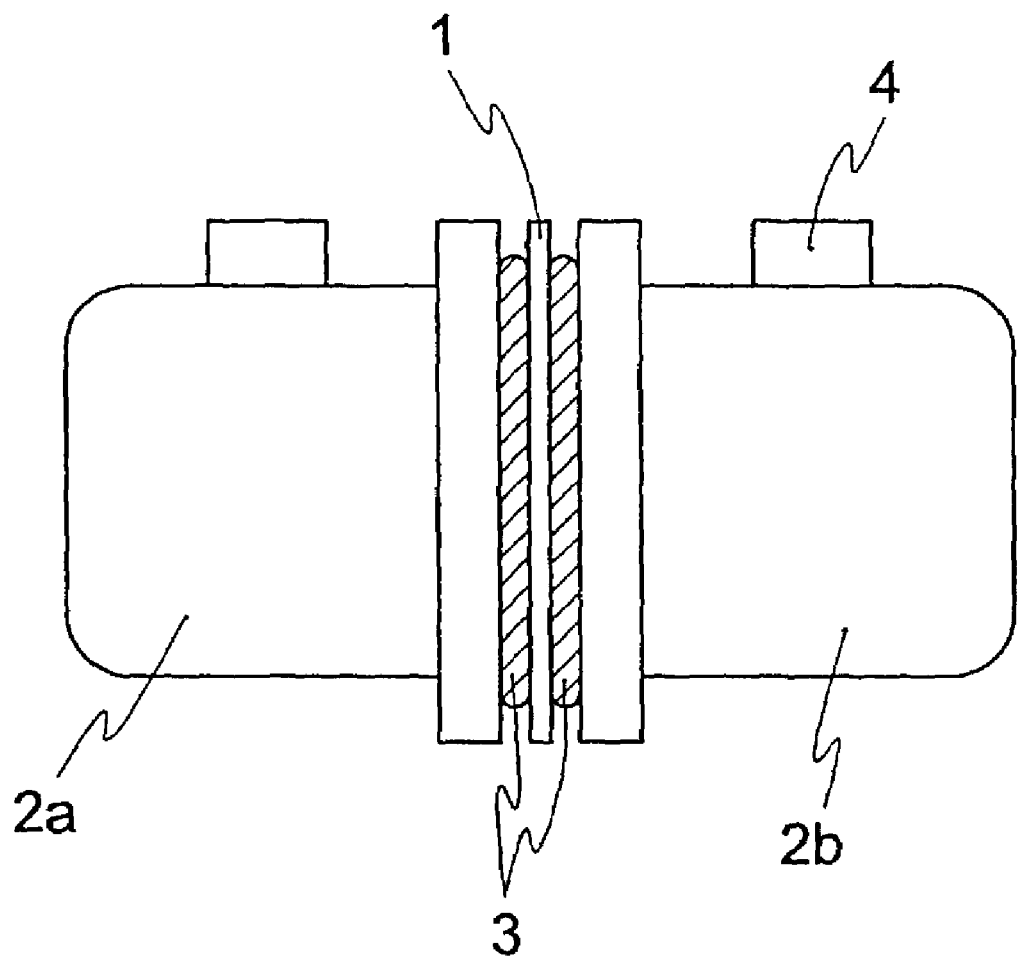
FIG. 1 is a schematic side view of the testing machine used for investigating liquid chemical permeability of the molded article of the present invention.

Examples of higher perfluro(alkyl vinyl ether) represented by the formula (1) include perfluoro(pentyl vinyl ether), perfluoro(hexyl vinyl ether), perfluoro(heptyl vinyl ether) and the like.

Further, as higher fluoro (alkoxyalkyl vinyl ether) represented by the formula (1), perfluoroalkoxyl group is preferable, whose $Rf^1$ is represented by the formula (2):

$$-(CH_2C(CF_3)FO)_n-Rf^2 \qquad (2)$$

in which n is an integer of 1 to 4 and $Rf^2$ is a perfluoroalkyl group having 1 to 5 carbon atoms.

Concrete examples thereof are
$CF_2=CFO-(CF_2C(CF_3)FO)-CF_3$,
$CF_2=CFO-(CF_2C(CF_3)FO)_2-CF_3$,
$CF_2=CFO-(CF_2C(CF_3)FO)_3-CF_3$, $CF_2{=}CFO{-}(CF_2C(CF_3)FO){-}CF_2CF_3$,
$CF_2{=}CFO{-}(CF_2C(CF_3)FO)_3{-}CF_2CF_3$,
$CF_2{=}CFO{-}(CF_2C(CF_3)FO)_3{-}CF_2CF_3$,
$CF_2{=}CFO{-}(CF_2C(CF_3)FO){-}CF_2CF_2CF_3$,
$CF_2{=}CFO{-}(CF_2C(CF_3)FO)_2{-}CF_2CF_2CF_3$,
$CF_2{=}CFO{-}(CF_2C(CF_3)FO)_3{-}CF_2CF_2CF_3$, and the like.

Among these,
$CF_2{=}CFO{-}(CF_2C(CF_3)FO){-}CF_2CF_2CF_3$,
$CF_2{=}CFO{-}(CF_2C(CF_3)FO)_2{-}CF_2CF_2CF_3$ and
$CF_2{=}CFO{-}(CF_2C(CF_3)FO)_3{-}CF_2CF_2CF_3$ are particularly preferable.

The composition among TFE, HFP and perfluoro(vinyl ether) (1) having a long side chain represented by the formula (1), namely TFE/HFP/(1), is 85 to 95.5/5 to 10/0.1 to 5 (% by mole), preferably 89 to 94.9/5 to 9/0.1 to 3.0 (% by mole).

When the HFP unit is more than 10% by mole, heat resistance is decreased because melting point is lowered. When the HFP unit is less than 5% by mole, melt-moldability and stress cracking resistance are decreased.

When the unit of higher perfluoro(vinyl ether) (1) is more than 5% by mole, prevention effect on liquid chemical permeation is decreased because crystallinity is decreased. When the unit of higher vinyl ether (1) is less than 0.1% by mole, the prevention effect on liquid chemical permeation is insufficient because modification is too small.

Examples of suitable modified FEP having a particularly excellent prevention effect on liquid chemical permeation are TFE/HFP/$CF_2{=}CFO{-}(CF_2C(CF_3)FO){-}CF_2CF_2CF_3$ (89 to 94.9/5 to 9/0.1 to 3 in a molar ratio, the same below), TFE/HFP/$CF_2{=}CFO{-}(CF_2C(CF_3)FO)_2{-}CF_2CF_2CF_3$ (89 to 94.9/5 to 9/0.1 to 3), and TFE/HFP/$CF_2{=}CFO{-}(CF_2C(CF_3)FO)_3{-}CF_2CF_2CF_3$ (89 to 94.9/5 to 9/0.1 to 3), but not particularly limited thereto.

The modified FEP of the present invention has a melt flow rate of 0.1 to 100 g/10 minutes, preferably 0.5 to 30 g/10 minutes. In particular, when the resin material is molded into a tube, the melt flow rate is preferably 0.5 to 3 g/10 minutes in view of excellent stress cracking resistance and melt-moldability.

The polymerization process for obtaining the modified FEP of the present invention is not particularly limited. It is possible to obtain modified FEP under usual polymerization conditions employing emulsion polymerization, suspension polymerization, solution polymerization or bulk polymerization which are known to the person skilled in the art.

According to the present invention, it is possible to prepare a molded article whose permeability to liquid chemicals is inhibited. Specifically, a molded article is obtained, whose permeation amount of nitric acid is at most $9.0 \times 10^{-7}$ g.cm/cm$^2$, preferably at most $8.0 \times 10^{-6}$ g.cm/cm$^2$ after 40 days in a liquid chemical permeation test as mentioned below. That is, the present invention also relates to a molded article obtained by molding the modified FEP.

It is possible to compound various additives to the modified FEP resin material of the present invention depending on its use in such an amount that objective effects of the present invention such as prevention effect on liquid chemical permeation are not deteriorated. Examples of the additive include a pigment, a molding auxiliary, a conductivity imparting agent and the like.

As the molding process of the resin material of the present invention, compression molding, transfer molding, extrusion molding, injection molding and blow molding are available, as is the case with conventional FEP.

Desired molded articles can be obtained according to such molding processes, and examples of the molded article include a sheet, a film, a packing, a round bar, a square bar, a pipe, a tube, a round bath, a square bath, a tank, a breaker, a filter housing, a flow meter, a pump, a valve, a cock, a connector and the like.

Among these, the molded article can be suitably used for tubes, pipes, sheets or films used for various chemical reactor, semiconductor production apparatus or liquid chemical feeders where impermeability to liquid chemical is particularly required.

As to ozone resistance of FEP, it is said that FEP has ozone resistance superior to that of PFA as described at p. 64 to 67, *Clean Technology* vol. 9, no. 12 (1999), written by Junji Mizutani. However, FEP is generally poor in cracking resistance, and therefore not suitable for the case where FEP is molded into a tubular object such as a tube or a pipe and used for ozone or ozone water as a practical product. On the contrary, the modified FEP resin material of the present invention is excellent not only in ozone resistance but also in cracking resistance surprisingly, which means that it is suitable even for the case where ozone or ozone water is used instead of conventional liquid chemicals.

Hereinafter, the present invention is explained in detail by means of examples, but is not limited thereto.

Firstly, measurements of each property were carried out according to the following procedures:

(1) Composition Analysis

Compositions of each polymer are determined according to the $^{19}$F-NMR method.

(2) Thermal Decomposition Temperature

Thermal decomposition temperature means temperature (°C.) at which the weight of the polymer is decreased by 1.0% by weight at a temperature increase rate of 10° C./minute using a differential scanning calorimeter (RDC-220 made by Seiko Instruments Inc.).

(3) Melting Point

Melting point means a value (°C.) determined from the melting curve when temperature is increased at a temperature increase rate of 10° C./minute using a differential scanning calorimeter (RDC-220 made by Seiko Instruments Inc.).

(4) Melt Flow Rate (MFR)

Melt flow rate is a value (g/10 minutes) measured according to ASTM D 2116 at 372° C. under a load of 5 kg using a melt indexer (made by Toyo Seiki K. K.).

(5) MIT Value (Flexibility Fatigue Resistance)

A test piece is cut from a compression-molded sheet having a thickness of 0.20 to 0.23 mm, and measurement is carried out according to ASTM D2176 under the test conditions of a load of 12.15 N (1.25 kgf), a bending rate of 178 times/minute and a bending angle of 135° using a MIT flexibility fatigue resistance measuring machine (made by Toyo Seiki K.K.).

(6) Liquid Chemical Permeation Test

A sheet having a thickness of 0.2 mm and a diameter of 120 mm φ is prepared by compression-molding using a heat press at 350° C.

The sample sheet 1 is interposed between two glass containers 2a and 2b (both having a capacity of 200 ml) by using fluorine rubber O-rings 3 as shown in FIG. 1. This unit is placed in a thermostat adjusted to 25° C. with filling the container 2a on one side of the sheet with 200 ml of 60% by weight nitric acid and the container 2b on the other side with 200 ml of pure water (liquid contact area of the sample sheet 1 is 70 mm φ). The unit is allowed to stand in this state and liquid is sampled in an amount of about 1 ml from the sampling port 4 installed on the container 2b containing pure water after 40 days, and the concentration of nitric acid ion in pure water (Yppm) is quantified using an ion chromatograph (made by Yokogawa Electric Corporation, IC7000-E). The permeation amount of nitric acid is calculated based on the following equation:

$$X = Y \times 200 \times 0.02 \times 10^{-6}(3.5 \times 3.5 \times 3.14)$$

EXAMPLE 1

An autoclave having an internal volume of 4.2 l was charged with 850 ml of pure water. Then, after replacing the internal air with pure nitrogen gas sufficiently, the autoclave was evacuated and charged with 850 g of HFP, 10 g of $CF_2=CFO-(CF_2C(CF_3)FO)_2-C_3F_7$ (hereinafter referred to as n=2VE) and 0.45 g of ω-hydroperfluoroheptanoic acid. Stirring was carried out and the inside temperature was kept at 25.5° C. TFE is then pressed into the autoclave and the inside pressure of the autoclave was kept at 0.83 MPaG. As a polymerization initiator, 4.7 g of $[H(CH_2CH_2)_3COO]_2$ (dodecafluroheptanoly peroxide, hereinafter referred to as DHP) dissolved in a small amount of perfluorohexane was added to start the reaction. Since the pressure decreases as the reaction proceeds, additional TFE was pressed thereinto to maintain the pressure at 0.83 MPaG. Stirring was stopped when the charged amount of TFE reached 330 g, and unreacted monomers and the solvent were purged out.

The white powder generated in the autoclave was washed with water and then $CH_3CCl_2F$ (R-141b), and the powder was dried at 200° C. for 5 hours. An objective modified FEP was obtained in an amount of 368 g.

Properties of the copolymer including the permeation amount of nitric acid are shown in Table 1.

EXAMPLE 2

An objective modified FEP was obtained in an amount of 376 g in the same manner as in Example 1 except for changing the amount of n=2VE to 20 g.

Properties of the copolymer including the permeation amount of nitric acid are shown in Table 1.

EXAMPLE 3

An objective modified FEP was obtained in an amount of 390 g in the same manner as in Example 1 except for changing the amounts of n=2VE and DHP to 8 g and 5.7 g, respectively and the polymerization temperature to 26.5° C.

Properties of the copolymer including the permeation amount of nitric acid are shown in Table 1.

EXAMPLE 4

An objective modified FEP was obtained in an amount of 362 g in the same manner as in Example 1 except for changing the amounts of n=2VE and DHP to 19 g and 6 g, respectively and the polymerization temperature to 26.5° C.

Properties of the copolymer including the permeation amount of nitric acid are shown in Table 1.

EXAMPLE 5

An objective modified FEP was obtained in an amount of 331 g in the same manner as in Example 1 except for changing the amounts of n=2VE and DHP to 20 g and 9.1 g, respectively Properties of the copolymer including the permeation amount of nitric acid are shown in Table 1.

Comparative Example 1

An unmodified FEP in an amount of 350 g was obtained in the same manner as in Example 1 except for changing the polymerization temperature to 26.5° C. and charging no n=2VE.

Properties of the copolymer including nitric acid permeation amount are shown in Table 1.

TABLE 1

| | Composition of copolymer (composition) (% by mole) | | | Melting point (° C.) | MFR (g/10 minutes) | MIT (ten thousand times) | Temperature at which weight is decreased by 1% (° C.) | Permeation amount of liquid chemical (g · cm/cm$^2$) |
|---|---|---|---|---|---|---|---|---|
| | TFE | HFP | n = 2VE | | | | | |
| Ex. 1 | 93.1 | 6.8 | 0.1 | 258 | 1.2 | 38 | 418 | 6.58 × 10$^{-7}$ |
| Ex. 2 | 93.0 | 6.7 | 0.3 | 257 | 1.7 | 48 | 416 | 7.93 × 10$^{-7}$ |
| Ex. 3 | 91.9 | 8.0 | 0.1 | 250 | 0.7 | 70 | 393 | 6.69 × 10$^{-7}$ |
| Ex. 4 | 91.9 | 7.8 | 0.3 | 250 | 1.6 | 51 | 391 | 6.61 × 10$^{-7}$ |
| Ex. 5 | 93.4 | 6.3 | 0.3 | 270 | 16 | 23 | 365 | 5.95 × 10$^{-7}$ |
| Com. Ex. 1 | 92.6 | 7.4 | 0 | 263 | 1.2 | 12 | 436 | 9.87 × 10$^{-7}$ |

The results in Examples 1 to 5 (Table 1) show that the permeation amounts of liquid chemical of FEP modified by higher perfluoro(vinyl ether) (1) (n=2VE) is reduced by as much as at least 20% compared to unmodified FEP of Comparative Example 1.

In addition, the modified FEP does not show any remarkable lowering of melting point or decomposition temperature while having heat resistance as high as that of Comparative Example 1. Further, MIT value thereof is increased, which means that cracking resistance is improved which has been regarded as a defect of conventional FEP. Accordingly, the obtained FEP is most suitable for tubes, pipes, sheets or films used for semiconductor production apparatus for which heat resistance and flexibility resistance are required.

INDUSTRIAL APPLICABILITY

According to the present invention, the resin material in which FEP obtained by modification using perfluoro(vinyl ether) having a long side chain is used provides improved prevention capability of liquid chemical permeation and stress cracking resistance while retaining inherent and excellent heat resistance and processability. Molded articles obtained from the resin material are suitable as a material used in the field of semiconductor production apparatus and the like.

What is claimed is:

1. A process for lowering permeability to liquid chemical, which comprises molding a fluorine-containing resin material comprising
   - 85 to 95.5% by mole of a repeating unit from tetrafluoroethylene,
   - 5 to 10% by mole of a repeating unit from hexafluoropropylene and 0.1 to 5% by mole of a repeating unit from at least one higher perfluoro(vinyl ether) represented by the formula (1):

$$CF_2=CF-O-Rf^1 \tag{1}$$

wherein $Rf^1$ is a perfluoroalkyl group having 5 to 10 carbon atoms or a perfluoro(alkoxyalkyl) group having 4 to 17 carbon atoms, wherein said liquid chemical is nitric acid, and said molded fluorine-containing resin material has a permeability to nitric acid of at most $9.0 \times 10^{-7}$ g.cm$^{2.}$ 2. The process for lowering permeability to liquid chemical of claim 1, wherein $Rf^1$ in the formula (1) is a perfluoro(alkoxyalkyl) group represented by the formula (2):

$$-(CF_2C(CF_3)FO)_n-Rf^2 \tag{2}$$

in which n is an integer of 1 to 4 and $Rf^2$ is a perfluoroalkyl group having 1 to 5 carbon atoms.

* * * * *